United States Patent
Beermann et al.

(10) Patent No.: US 12,011,766 B2
(45) Date of Patent: Jun. 18, 2024

(54) CUTTING PART AND LATHE

(71) Applicant: Phoenix Contact GmbH & Co. KG, Blomberg (DE)

(72) Inventors: Benedikt Beermann, Paderborn (DE); Daniel Schanz, Neuweiler (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 141 days.

(21) Appl. No.: 17/299,818

(22) PCT Filed: Nov. 27, 2019

(86) PCT No.: PCT/EP2019/082670
§ 371 (c)(1),
(2) Date: Jun. 4, 2021

(87) PCT Pub. No.: WO2020/120132
PCT Pub. Date: Jun. 18, 2020

(65) Prior Publication Data
US 2022/0016714 A1 Jan. 20, 2022

(30) Foreign Application Priority Data
Dec. 12, 2018 (BE) .................................. 2018/5880

(51) Int. Cl.
*B23B 27/04* (2006.01)
*B23B 27/00* (2006.01)
*B23B 27/22* (2006.01)

(52) U.S. Cl.
CPC .......... *B23B 27/005* (2013.01); *B23B 27/045* (2013.01); *B23B 27/22* (2013.01)

(58) Field of Classification Search
CPC ... B23B 27/045; B23B 27/22; B23B 27/1607; B23B 2200/323; B23B 2200/087; B23B 2200/086; B23B 3/22; B23B 27/005
See application file for complete search history.

(56) References Cited

U.S. PATENT DOCUMENTS 4,626,149 A * 12/1986 Holy ....................... B23B 29/24
                                                82/131
5,873,683 A   2/1999 Krenzer
5,898,984 A   5/1999 Chiba et al.
(Continued)

FOREIGN PATENT DOCUMENTS

CN    101695761 A    4/2010
EP      3323540 A1   5/2018
(Continued)

*Primary Examiner* — Alan Snyder
(74) *Attorney, Agent, or Firm* — Calderon Safran & Wright, P.C.; David S. Safran

(57) ABSTRACT

A cutting part (1) for a tool head (2) for a lathe (3) for machining a workpiece (4), having a cutting edge (5) for removing material from the workpiece (4) and having a rake face (6) for guiding away the removed material or cuttings. The problem of providing a cutting part (1) which can be realized in a simple manner and with which lead-free materials can also be machined is solved in that a flat structure (7) is formed in the rake face (6) of the cutting part (1) adjoining the cutting edge (5) for breaking the cuttings. A lathe (3) for machining a workpiece (4), having a tool head (2) is provided with at least one such cutting part (1).

7 Claims, 6 Drawing Sheets

(56) References Cited

U.S. PATENT DOCUMENTS

| | | | |
|---|---|---|---|
| 6,217,264 | B1 | 4/2001 | Kim et al. |
| 6,524,036 | B1 | 2/2003 | Kolker |
| 2016/0243624 | A1 | 8/2016 | Tomoda et al. |
| 2018/0318939 | A1 | 11/2018 | Harada et al. |

FOREIGN PATENT DOCUMENTS

| | | |
|---|---|---|
| JP | 2006-341321 A | 12/2006 |
| JP | 2007216327 A | 8/2007 |
| JP | 2007-290059 A | 11/2007 |

\* cited by examiner

CUTTING PART AND LATHE

BACKGROUND OF THE INVENTION

Field of the Invention

The invention relates to a cutting part for a tool head for a lathe for machining a workpiece, with a cutting edge for removing material from the workpiece and with a face for guiding away the removed material—cuttings. Moreover, the invention relates to a lathe for machining a workpiece.

Description of the Related Art

Lathes have been known for many years from the state of the art and are used for processing rotationally-symmetrical workpieces. In the case of the processing of the workpiece, material is removed with the cutting part. For this purpose, workpieces and tool heads execute a relative movement with respect to one another, wherein the cutting part removes material from the workpiece via its cutting edge. Usually, the cutting part is applied to the rotating workpiece. The removed material is referred to as cuttings and flows off over the face of the cutting part. The properties of the cuttings that form depend in particular on the material properties. Primarily, the formation of long flow cuttings is problematic, since the cuttings get caught in the lathe and thus can jeopardize process safety. In order to avoid the formation of long flow cuttings, in the past, material alloys have been used as the basic material for the workpieces, which contained a material that improves the machinability. Especially the addition of lead by alloying is preferably used, since lead provides for good chip breaking.

In particular, because of the health risks associated with the use of lead, there is also an advantage in being able to process lead-free materials without risks or in a process-safe manner. In order to guide away cuttings and also to be able to break them, and thus to be able to prevent long flow cuttings, cutting parts with faces that are formed in a special way are used in the state of the art.

Known from Chinese patent application publication CN 101695761A is, for example, a diamond-shaped cutting part, in which the upper surface is recessed downward, whereby a face with a concave surface is formed for guiding the cuttings. On the concave surface of the faces, in addition, projections that increase in size from the tips of the cutting part to the center are formed, which projections are used for breaking the cuttings.

It is disadvantageous in the state of the art that the cutting parts have an extremely complex structure; the planning and production process is thus extremely time-intensive and costly.

SUMMARY OF THE INVENTION

The object of the invention is thus to provide a cutting part that can be produced in a simplified manner and with which lead-free materials can also be machined. Moreover, the object of the invention is to provide a corresponding lathe.

The object is achieved according to the invention in that a tool head for a lathe for machining a workpiece, with a cutting edge for removing material from the workpiece and with a face for guiding away the removed material has, adjoining the cutting edge, a flat structure for breaking the cuttings in the face of the cutting part. Especially preferably, the structure has a flat top and circumferential lateral surfaces. Even more preferably, the structure has the same height over its entire surface. When speaking of a flat top, that does not thus mean that the top cannot be rough. Also, manufacturing tolerances in the production of the structure—in particular tolerances in the height—are conceivable. It is meant that the structure itself has no—additional—ridges or recesses. Because of the simplicity of the structure, the cutting part according to the invention has the advantage that it can be easily produced.

In one configuration, the cutting edge has a longitudinal axis, and the longitudinal axis of the cutting edge is arranged parallel to the top of the structure. Quite especially preferably, the longitudinal axis of the cutting edge is in a structural plane formed by the top of the structure.

In order to be able to produce the structure as easily as possible, the material that lies around the structure is removed in a variant. Here, all methods that are suitable for removing material can be used. In a quite especially preferred configuration, the structure is produced by laser engraving. In this case, the surrounding area is laser-engraved around the structure, i.e., removed, so that the structure from the surrounding—removed—area is taken off. Especially preferably, the material around the structure is removed to a depth of approximately 0.2 mm, so that the structure has a height of approximately 0.2 mm. Laser engraving can also produce filigree structures in an elegant way, since very specific material can be removed.

Even more preferably, the structure has a width of less than one millimeter, in particular a width of 0.6 mm. Even more preferably, the structure has a length of 1.2 mm.

In an especially preferred configuration, the structure is designed as a herringbone pattern. A herringbone pattern is distinguished by a periodic arrangement of individual burrs, wherein two burrs are always arranged beside one another and inclined with respect to one another.

In one configuration, the structure has a middle stem and burrs that originate from the middle stem.

The individual burrs can be arranged differently. In a quite especially preferred configuration, the burrs are inclined toward the cutting edge and are further arranged at an angle of less than 90° to the middle stem. Especially preferably, the angle is 60°. In an alternative configuration, the individual burrs are arranged at an angle of 90° to the middle stem. The angle is measured between the longitudinal axis of the middle stem and the longitudinal axis of the burrs.

In this way, the advantage results that the cavity between the middle stem and burrs forms an acute angle; thus, an edge is formed on which the cuttings can be broken.

The individual burrs are preferably arranged on the middle stem at a uniform distance with respect to one another. Even more preferably, in each case, two burrs are arranged at the same height of the middle stem, wherein one of the two burrs is arranged on each side of the middle stem.

Both the middle stem and the individual burrs can be designed differently in various variants of the structure. Both the middle stem and the burrs have a specific width. In a variant, the width of the middle stem corresponds to the width of the burrs. In an alternative variant, the middle stem is wider in design than the burrs. In another alternative variant, the middle stem has a smaller width than the burrs. The burrs themselves can all have the same width or can have various widths.

The middle stem preferably extends along a longitudinal axis; it is thus preferably linear. In an especially preferred configuration, the longitudinal axis of the middle stem and the longitudinal axis of the cutting edge form an angle of 90°.

In an especially preferred variant, the burrs taper toward their end that faces away from the middle stem.

In an additional or alternative configuration, starting from their end that faces the middle stem to the end that faces away from the middle stem, the burrs first have a cross-sectional widening and then a cross-sectional constriction. The individual burrs are thus bulbous in design. In this case, the cross-sectional widening can be made symmetrical to the longitudinal axis of an individual burr or can have an asymmetry. Also, the cross-sectional constriction can be made symmetrical to the longitudinal axis of an individual burr or can have an asymmetry. Preferably, both the cross-sectional widening and the cross-sectional constriction are both symmetrical or both asymmetrical. As an alternative, the cross-sectional widening is made symmetrical and the cross-sectional constriction is made asymmetrical, or vice versa.

In addition to the cutting part, the invention relates, moreover, to a lathe for machining a workpiece. The lathe has a tool head, wherein the tool head has at least one cutting part with a cutting edge for removing material from the workpiece and with a face for guiding away the removed material—cuttings.

In the case of the lathe, the object is achieved with the features of the coordinate claim, in such a way that adjoining the cutting edge is a flat structure for breaking the cuttings in the face of the cutting part.

All statements made in connection with the cutting part according to the invention as regards advantageous configurations of the cutting part with the advantages thereof apply accordingly for the lathe according to the invention.

Another configuration is distinguished by the functionality of the lathe. In an especially preferred configuration of the lathe, the tool head rotates around the workpiece when the lathe is in operation, i.e., during the rotating process. The workpiece itself in this case does not execute any rotational movement. Rather, the workpiece executes translatory movements. In the case of the conventional lathes known from the state of the art, the workpiece rotates, and the tool head or the cutting part is guided on the rotating workpiece. As a result of the tool head now rotating with the cutting part around the workpiece, it is possible to process or to produce a larger number of units on workpieces per unit of time.

In another configuration, the lathe is characterized in that the tool head has at least one additional cutting part. The tool head preferably has two cutting parts, which are arranged even more preferably opposite to one another around the workpiece.

If the lathe is then designed, moreover, so that the tool head rotates around the workpiece when the lathe is in operation, both cutting parts thus rotate around the workpiece and simultaneously remove material on opposite sides of the workpiece. In this way, the manufacturing process of the workpiece is further optimized. Each of the cutting parts is designed according to the invention.

In particular, there are now a number of options for configuring and further developing the lathe according to the invention as well as the cutting part according to the invention. To this end, reference is made to the description of preferred embodiments in connection with the drawings.

DETAILED DESCRIPTION OF THE INVENTION

Figure 1:
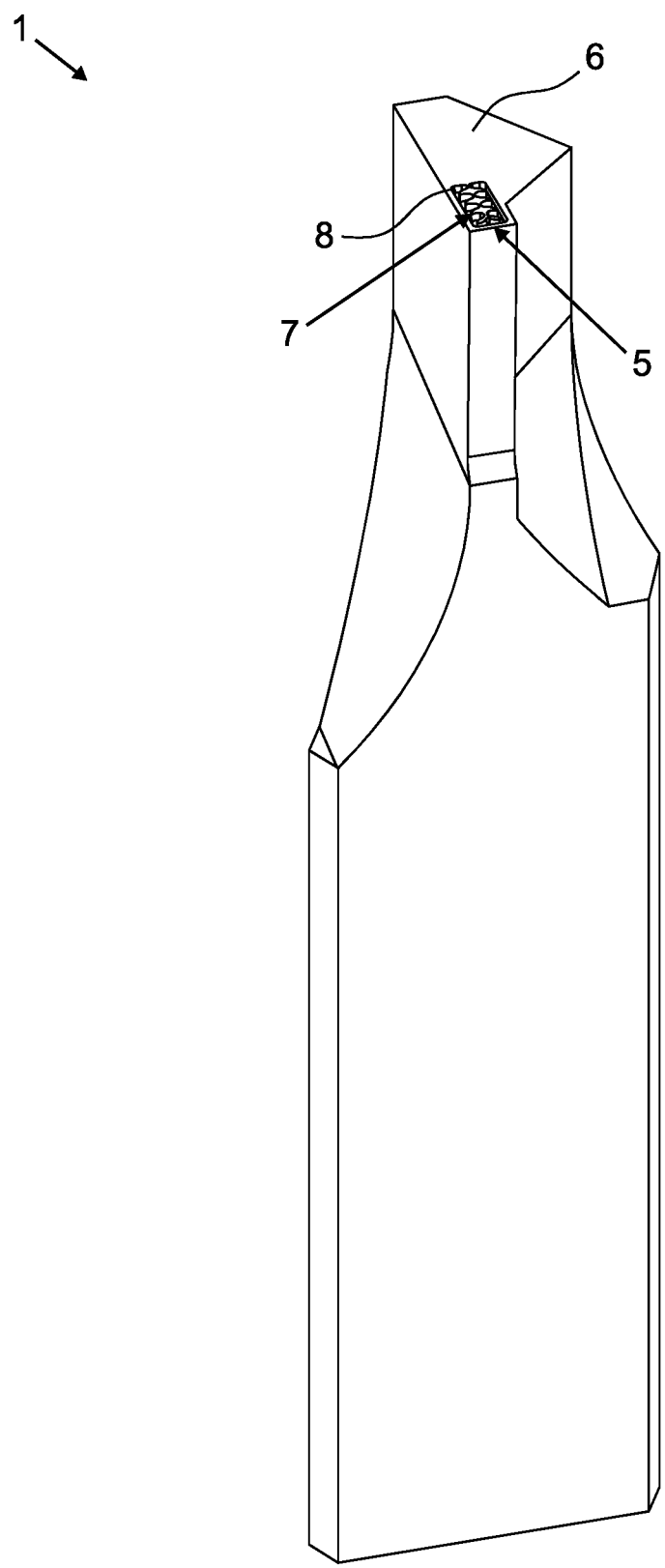
FIG. 1 shows a cutting part of a tool head of a lathe.

FIG. 1 shows a cutting part 1 for a tool head 2 for a lathe 3. The lathe 3 is designed for machining a workpiece 4. The cutting part 1 has a cutting edge 5 for removing material from the workpiece 4. Moreover, the cutting part 1 has a face 6, via which the cuttings that are produced during processing of the workpiece 4 are guided away. Adjoining the cutting edge 5 is a structure 7 that is used for breaking the cuttings in the face 6. The cuttings that are guided away over the face 6 are thus broken, i.e., crushed, on the structure 7. Thus, long flow cuttings are crushed to form discontinuous chips, which, for example, are only a few millimeters large/long instead of a few tens of centimeters. The structure 7 is flat in design and is thus created in such a way that the material in the surrounding area 8 of the structure 7 is removed. In the depicted embodiment, the area 8 has been laser-engraved around the structure. The top of the structure 7 is essentially flat in design.

Figure 2A:
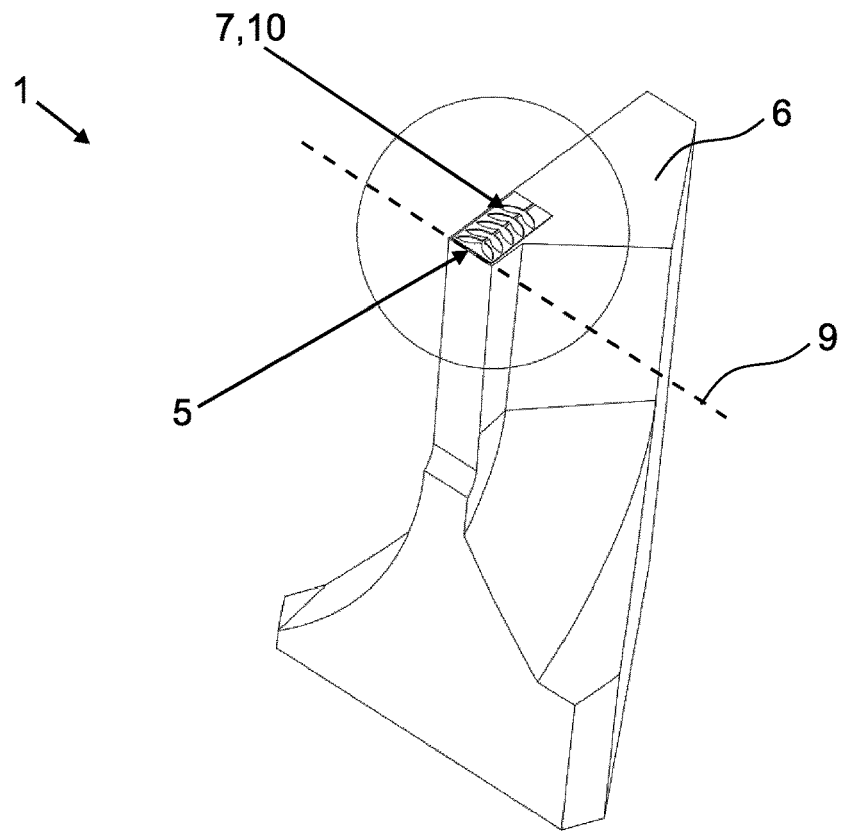
FIG. 2a shows a part of a cutting part in another perspective.
Figure 2B:
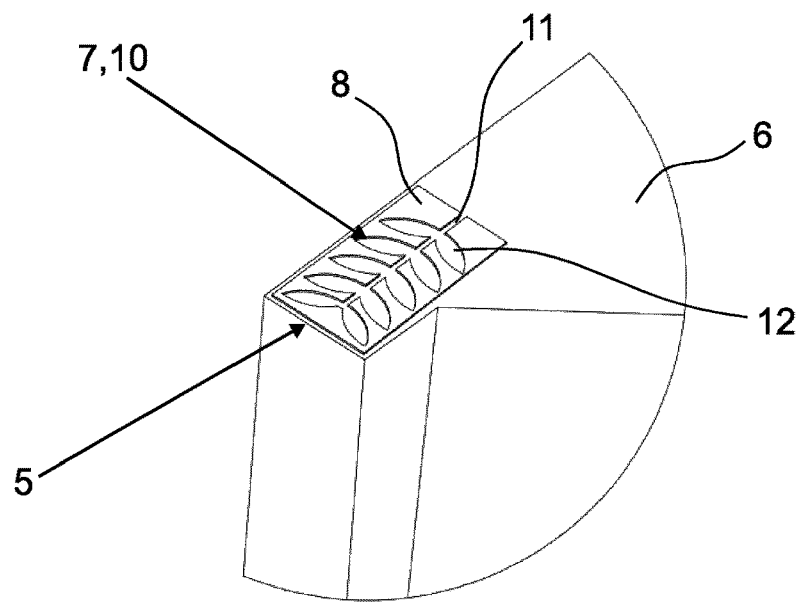
FIG. 2b shows a detailed cutaway of FIG. 2a, which shows the structure.
Figure 3A:
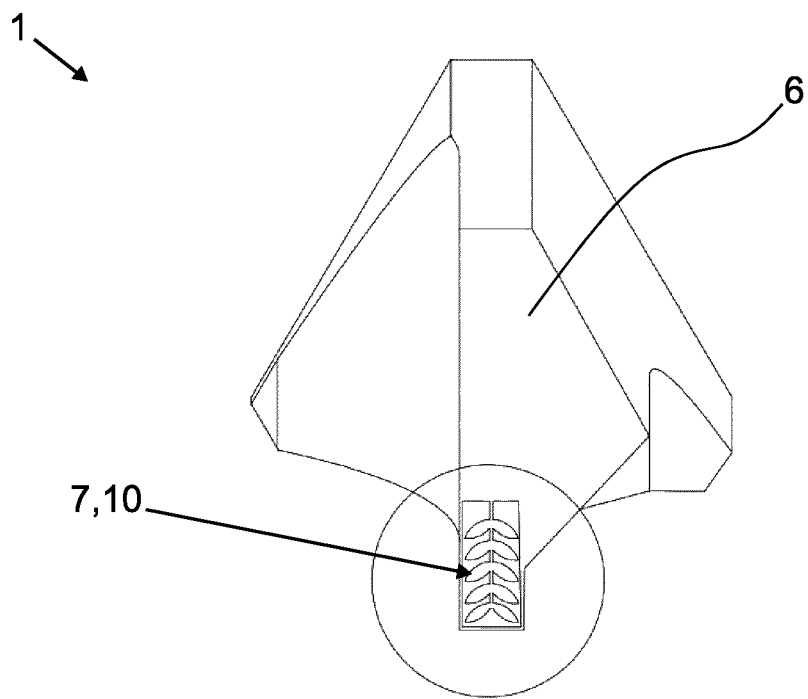
FIG. 3a shows a top view of the cutting part of FIG. 2a,
FIG. 3b shows a detailed cutaway of FIG. 3a, which shows the structure.
Figure 3B:
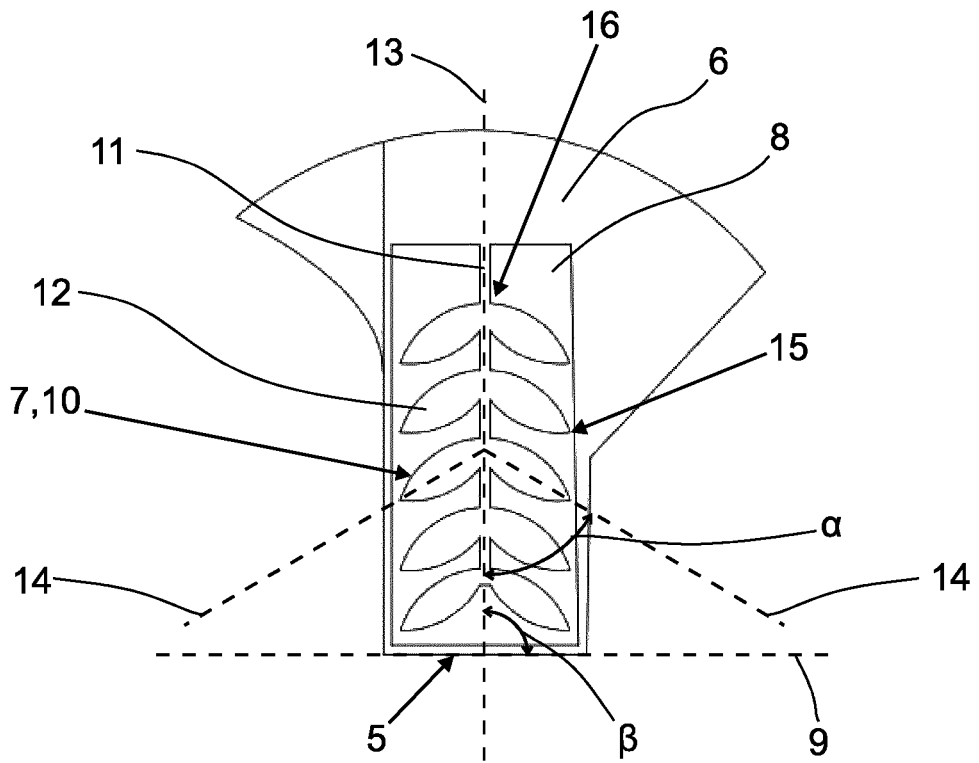

In FIGS. 2a and 3a, in each case the upper part of the cutting part 1 is depicted in various perspectives. FIG. 2a shows an oblique top view of the cutting part 1, whereas FIG. 3a shows a top view of the cutting part 1. In FIGS. 2b and 3b, in each case detailed cutaways of FIGS. 2a and 3a are shown, wherein the cutaways in FIGS. 2a and 3a in each case are marked by a circle.

As the figures show, the cutting edge 5 has a longitudinal axis 9. The structure 7 is designed as a herringbone pattern 10 and has a middle stem 11 and burrs 12, which originate from the middle stem 11. The structure 7, 10 is especially clearly depicted in FIG. 3b, so that it is described in more detail based on FIG. 3b. The individual burrs 12 are inclined toward the cutting edge 5, wherein the angle α between the longitudinal axis 13 of the middle stem 11 and the longitudinal axis 14 of a burr 12 is 60°. Moreover, the longitudinal axis 13 of the middle stem 11 is perpendicular to the longitudinal axis 9 of the cutting edge 5; the angle ß is thus 90°.

The individual burrs 12 point toward their end 15 that faces away from the middle stem 11. Overall, the burrs 12 that are depicted in FIGS. 2a to 3b have a bulbous shape, i.e., starting from their end 16 that faces the middle stem 11, they first have a cross-sectional widening and then a cross-sectional constriction. The middle stem 11 itself is narrow in design, i.e., it has a small width and, moreover, a smaller width than the burrs.

Figure 4:
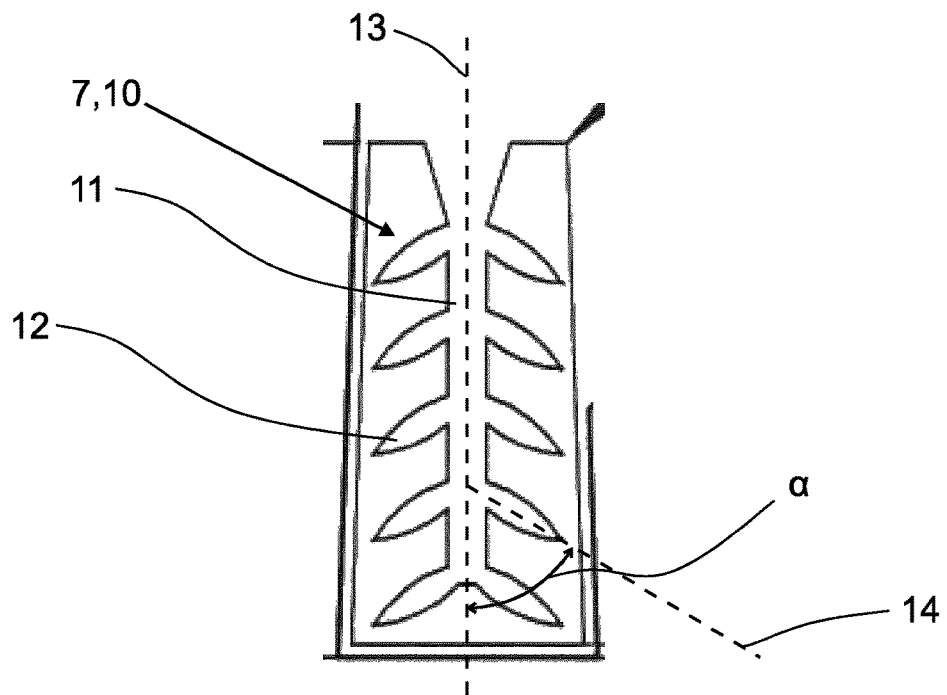
FIG. 4 shows a second variant of a structure.

FIG. 4 shows an alternative configuration of a structure 7 in the form of a herringbone pattern 10. Unlike the configuration shown in FIG. 3b, the structure 7 that is shown in FIG. 4 has a middle stem 11, which is considerably wider in design than the burrs 12. Moreover, the burrs 12 are not bulbous in design, but rather are more slender, and have almost no cross-sectional widening. The angle α between the longitudinal axis 13 of the middle stem 11 and the longitudinal axis 14 of a burr 12 is also 60°. Both in the case of the structure of FIG. 3b and of FIG. 4, the burrs are arranged at the same distance apart.

Figure 5:
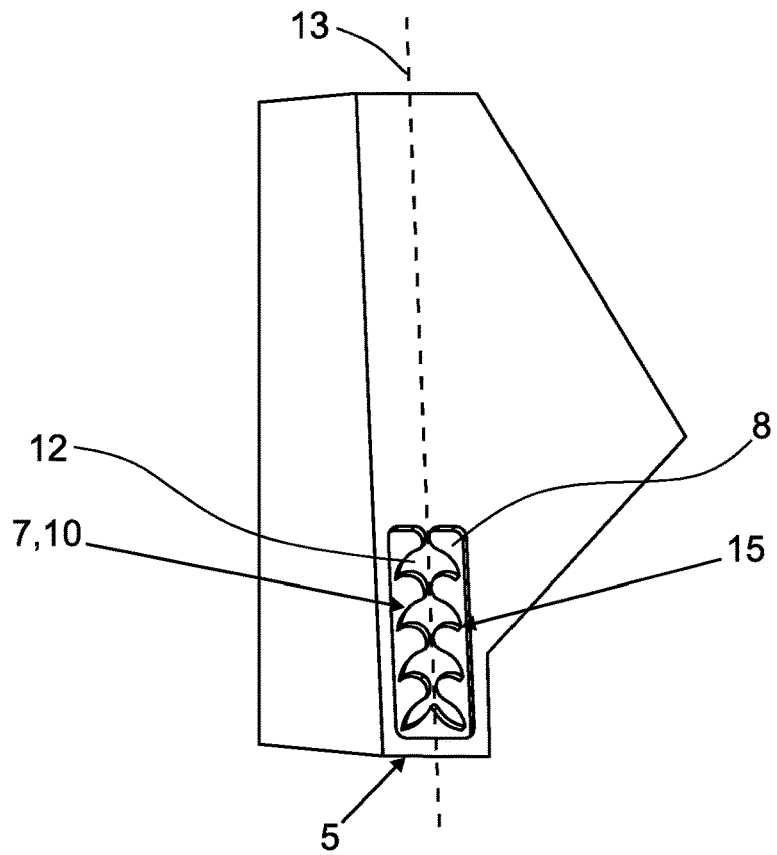
FIG. 5 shows a detailed cutaway of FIG. 1 with a third variant of a structure.

FIG. 5 shows another alternative configuration of a structure 7 and at the same time shows a detailed cutaway of the cutting part 1 that is depicted in FIG. 1. The removed area 8 is especially clearly depicted around the structure 7. The structure 7 has burrs 12, which in each case are arranged in pairs around the middle stem 11. The burrs 12 are not all identical in design; in fact, the burrs 12 that are arranged closest to the cutting edge 5 have a shape that is different from the other burrs 12. The other burrs are designed in the shape of shark fins. The burrs thus point toward their end 15 that faces away from the middle stem 11, wherein the two sides of a burr 12 are curved in the same direction. The ends 16 of two adjacent burrs that face the middle stem 11 directly adjoin one another, so that two adjacent burrs 12 touch.

Figure 6:
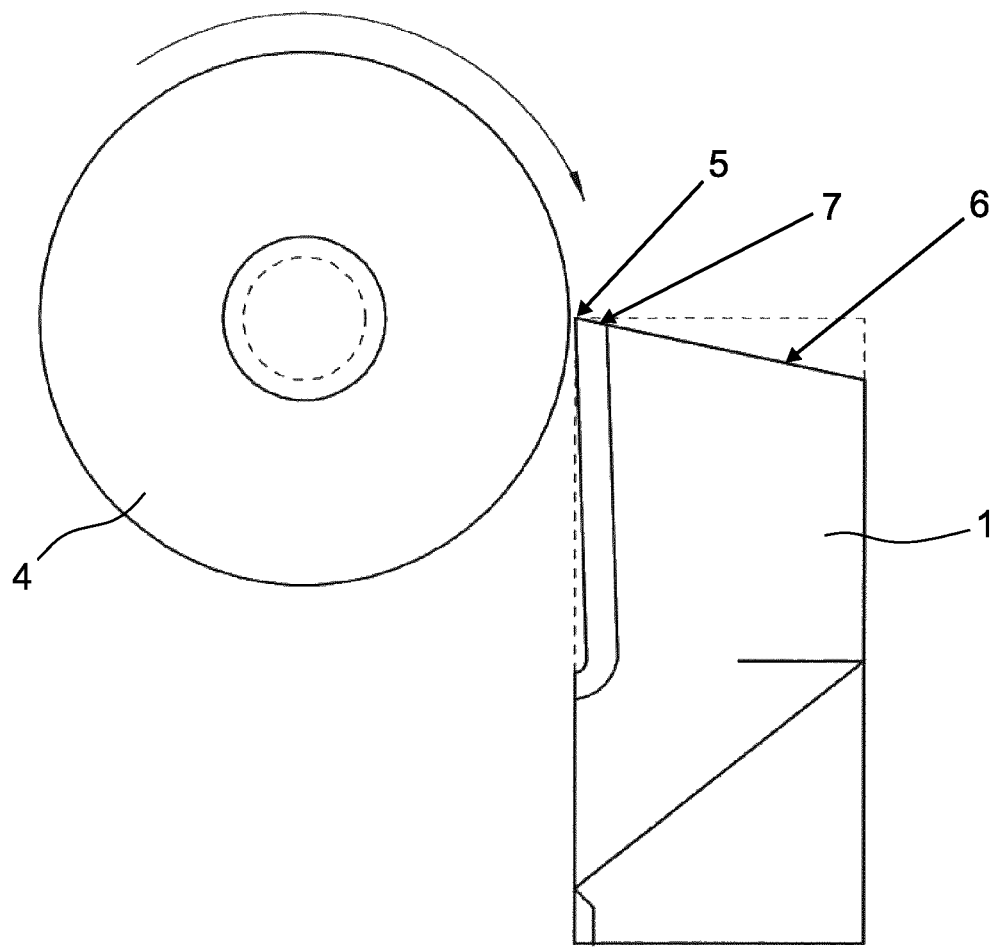
FIG. 6 shows a partial cutaway of a cutting part with a workpiece.

FIG. 6 shows a diagrammatic depiction of the cutting part 1 together with a workpiece 4, which is processed. The cutting part 1 and the workpiece 4 perform a rotational movement relative to one another, which is identified by the arrow. The cutting part 1 attacks the workpiece 4 with its cutting edge 5 and removes material from the workpiece. The removed material flows in the form of cuttings over the face 6 of the cutting part 1. Adjoining the cutting edge 5 is the structure 7 for breaking the cuttings in the face 6, so that the cuttings are broken directly.

Figure 7:
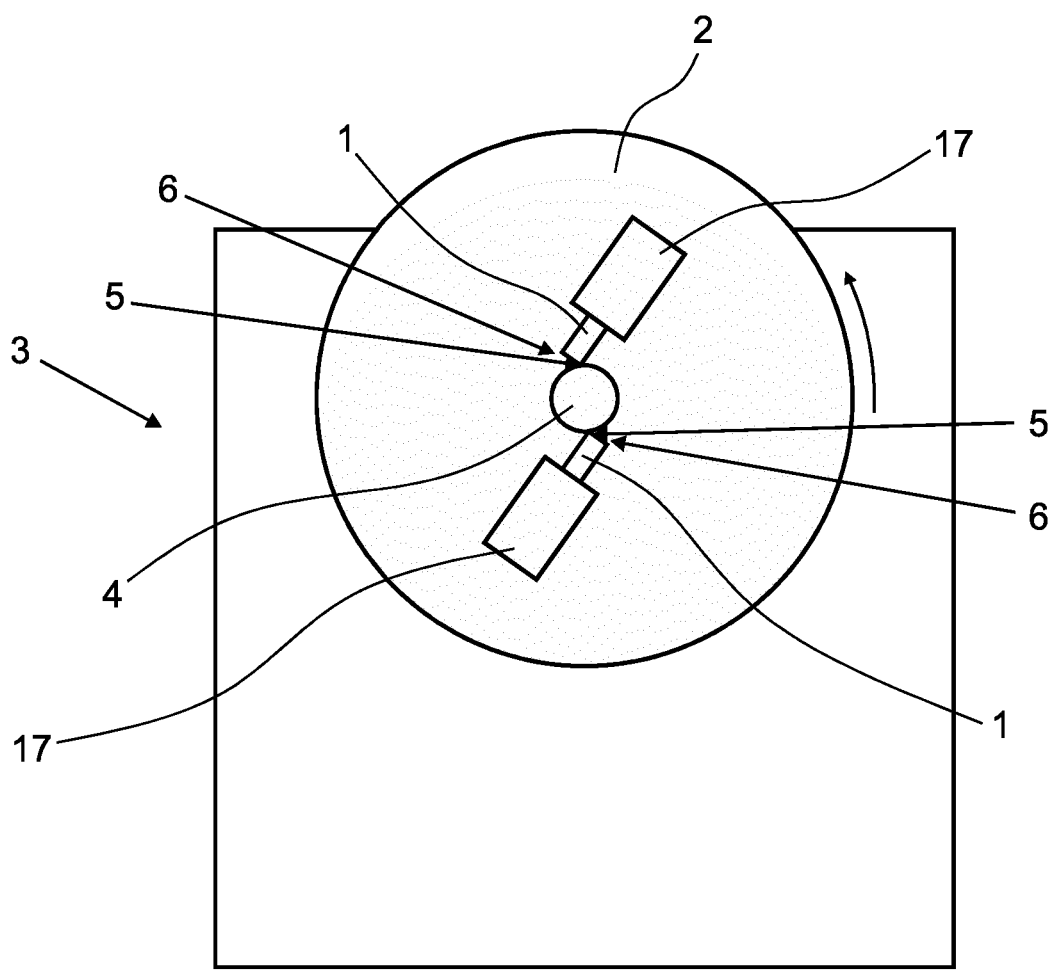
FIG. 7 shows a diagrammatic depiction of a lathe with two cutting parts and a workpiece.

In FIG. 7, a lathe 3 is depicted diagrammatically. The lathe 3 has a tool head 2. The workpiece 4 that is to be processed is introduced into the center of the tool head 2 or is guided through a recess in the tool head 2. The tool head 2 has two cutting parts 1, which are held with cutting part holders 17 and connected to the tool head 2. Structures 7 that adjoin the cutting edge 5 are made in the faces 6 of the cutting parts 1, which structures serve to break the cuttings that are produced. In the operating state, or in the work mode, the tool head 2 rotates around the workpiece 4, wherein the workpiece 4 itself does not perform any rotational movement. In this way, the workpieces 4 can be processed more precisely and also faster than when the workpiece 4 would rotate and the tool head 2 would not execute any rotational movement.

What is claimed is:

1. A cutting part for a tool head for a lathe for machining a workpiece, comprising:
    a cutting edge for removing material from the workpiece and with a face for guiding away the removed cuttings, and
    a flat structure adjoining the cutting edge for breaking the cuttings in the face of the cutting part, wherein the flat structure has a constant height over its entire surface,
    wherein the flat structure has a herringbone pattern,
    wherein the herringbone pattern of the flat structure has a middle stem perpendicular to the longitudinal axis of the cutting edge and burrs that originate from each side of the middle stem, and wherein the individual burrs are inclined toward the cutting edge and are arranged at an angle ($\alpha$) of less than 90° or 90° relative to the middle stem, and
    wherein, in a direction from an end of the burrs that faces the middle stem to an end of the burrs that faces away from the middle stem, the burrs first have a cross-sectional widening and then a cross-sectional constriction.

2. The cutting part according to claim 1, wherein the flat structure has been produced by removing material in an area surrounding the flat structure.

3. The cutting part according to claim 1, wherein the burrs taper towards an end that faces away from the middle stem.

4. A lathe for machining a workpiece, comprising:
    a tool head with at least one cutting part that has a cutting edge for removing material from the workpiece and a face for guiding away the removed material cuttings,
    wherein a flat structure is provided adjoining the cutting edge for breaking the material cuttings in the face of the cutting part, wherein the flat structure has constant height over its entire surface,
    wherein the flat structure has a herringbone pattern,
    wherein the herringbone pattern of the flat structure has a middle stem perpendicular to the longitudinal axis of the cutting edge and burrs that originate from each side of the middle stem, and wherein the individual burrs are inclined toward the cutting edge and are arranged at an angle ($\alpha$) of less than 90° or 90° relative to the middle stem, and
    wherein, in a direction from an end of the burrs that faces the middle stem to an end of the burrs that faces away from the middle stem, the burrs first have a cross-sectional widening and then a cross-sectional constriction.

5. The lathe according to claim 4, wherein the flat structure has been produced by removing material in an area surrounding the flat structure.

6. The lathe according to claim 4, wherein the tool head is adapted to rotate around the workpiece when the lathe is in operation, and wherein the workpiece is mounted so that it does not perform any rotational movement.

7. The lathe according to claim 4, wherein the tool head has at least one additional cutting part.

* * * * *